Patented Oct. 12, 1943

2,331,725

UNITED STATES PATENT OFFICE 2,331,725

PREPARATION OF 2-METHYL-1,4-NAPHTHOQUINONE

Robert W. Price, Orangeburg, and Gustaf H. Carlson, Pearl River, N. Y., assignors to Lederle Laboratories, Inc., New York, N. Y., a corporation of Delaware No Drawing. Application January 31, 1941, Serial No. 376,868

3 Claims. (Cl. 260—396)

The present invention relates to an improved process for the preparation and purification of 2-methyl-1,4-naphthoquinone.

Until recent years the principal use for 2-methyl-1,4-naphthoquinone was as an intermediate in the preparation of dye materials. The use of the compound as an intermediate in such processes did not require that it be a highly purified product. In recent years, however, 2-methyl-1,4-naphthoquinone has been used as an anti-hemorrhagic substance and also in the preparation of other anti-hemorrhagic compounds such as (vitamin $K_1$) 2-methyl-3-phytyl-1,4-naphthoquinone and 2-methyl-1,4-naphthoquinone-3-acetic acid.

In general, the prior methods for preparing 2-methyl-1,4-naphthoquinone comprise the oxidation of beta-methylnaphthalene by means of chromic anhydride in a solution of acetic acid. One such method is described by Fieser (J. Biol. Chem. 133, 392 (1940)) in which he states that the reaction is completed in about one hour as contrasted to the method described by Anderson (J. Biol. Chem. 103, 405 (1933)) which requires three days, or the method described by Fieser in J. Biol. Chem. (J. A. C. S., 61, 3216 (1939)) which requires 36 hours and recovery of the product by steam distillation. The method described by Fieser involves adding chromic anhydride in a mixture of water and glacial acetic acid to a glacial acetic acid solution of beta-methyl-naphthalene while allowing the temperature to rise to about 60° C. after which the mixture is heated to about 90° C. for one hour and then diluted with a relatively large volume of water. The crude precipitated product is then crystallized (without filtering) from methyl alcohol to produce yields of about 38 to 40% of the 2-methyl-naphthoquinone. When the product is to be used for biological purposes the process directs that the product should be recrystallized from methanol and the traces of insoluble material removed by filtration.

While the above prior art processes of adding the acetic acid solution of chromic acid to an acetic acid solution of beta-methylnaphthalene result in good average yields, they possess the disadvantage that in large scale production considerable quantities of oily or tarry products are produced which make the 2-methylnaphthoquinone difficult to isolate and purify. When relatively crude or impure chromic acid and beta-methylnaphthalene are used in the processes, correspondingly larger quantities of oily or tarry substances are produced and the processes, therefore, usually require that the starting materials be relatively pure substances.

In prior methods for the preparation of 2-methylnaphthoquinone, the purification of the final product comprised recrystallization from methyl alcohol. We have found that, even after two recrystallizations from methanol, the 2-methylnaphthoquinone obtained is of an inferior quality often containing as much as 0.01 to 0.02% of chromium. The presence of such quantities of chromium makes the product undesirable as an anti-hemorrhagic compound itself or as an intermediate in the preparation of vitamin $K_1$ type of naphthoquinones.

In accordance with the present invention we have discovered that when the acetic acid solution of beta-methylnaphthalene is added to the acetic acid solution of chromic acid, instead of in the reverse order used in the prior processes, much smaller amounts of oily or tarry materials are produced and at the same time the yields are just as good and the reaction is completed in an equally short period of time. Further, the starting materials may be crude or impure without adversely effecting the reaction and the quality of the product produced.

It is an object of the present invention to provide an improved process for the preparation of 2-methylnaphthoquinone which is substantially free from contamination with chromium.

It is a further object of the present invention to provide a process for the purification of 2-methylnaphthoquinone contaminated with chromium.

It is also an object of the present invention to provide a process for the preparation of 2-methylnaphthoquinone which is easily carried out and which permits reproducible yields of a product which is essentially free of chromium.

Broadly, our invention comprises the oxidation of 2-methyl-naphthalene by means of chromic acid in the presence of acetic acid to produce 2-methylnaphthoquinone under certain preferred conditions to be hereafter described. The crude or impure 2-methylnaphthoquinone obtained by the oxidation of 2-methylnaphthalene is dissolved in a water-immiscible organic solvent such as chloroform, which is inert to or does not react with the 2-methylnaphthoquinone. The solution is filtered to remove any solid material which may be present and is then washed with a dilute aqueous solution of an inorganic acid, such as 15–20% solution of hydrochloric acid, which will form water soluble salts with chromium and which is inert toward the 2-methylnaphthoquinone. The aqueous acid solution now containing also the chromium salt is easily separated from the solution of the 2-methylnaphthoquinone in the organic solvent. This washing may be repeated one or more times until all of the chromic acid which contaminated the product has been removed. The solution of the product in the organic solvent is treated with a drying agent such as anhydrous sodium sulfate to remove water, after which a small amount of activated charcoal is added and the solution filtered. The solvent is then removed by distillation, preferably under vacuum, the solvent being recovered if desired, and the residue is crystallized from methanol. In a preferred method this residue is recrystallized from a mixture of methanol and glacial acetic acid. In every case the bright yellow crystalline product obtained contains not more than about 0.001% of chromium.

In carrying out the oxidation of 2-methylnaphthalene in accordance with our improved process, the chromic acid is dissolved in 80% acetic acid and the 2-methylnaphthalene, dissolved in glacial acetic acid is gradually added to the mechanically stirred and cooled solution of chromic acid. The addition of the glacial acetic acid solution of 2-methylnaphthalene usually requires only about one hour and the temperature of the reaction mixture should be maintained at about 30–65° C. After the addition is complete the reaction mixture is heated to about 60–65° C. for fifteen minutes after which it is cooled to about 35° C., diluted with a relatively large volume of cold water and stirred vigorously for a few minutes. The precipitate is then collected, in a centrifuge preferably, and washed with several portions of cold water or until the filtrate is colorless. The moist product obtained is then ready for the purification treatment as outlined heretofore. This improved process has several outstanding advantages over the prior art processes; namely, the addition of a concentrated solution of the hydrocarbon dissolved in glacial acetic acid to the chromic acid solution permits the use of smaller quantities of glacial acetic acid than was possible by the prior art processes. It is especially advantageous in large scale production that a small volume of concentrated hydrocarbon solution be added to the larger volume of chromic acid solution rather than in reverse order using larger volumes of weaker hydrocarbon solution as in the prior art. This method of addition also results in the production of smaller amounts of oily or tarry products, and hence the final product is much easier to isolate. The oxidation is complete in a relatively short time; the conditions are such that reproducible results are easily obtained; and the process does not require the use of pure starting materials.

The invention is further illustrated by the following specific examples, but the invention is not to be limited by the details set forth therein.

*Example 1*

A solution of 1.42 kg. of technical 2-methylnaphthalene in 1 liter of glacial acetic acid was added, during one hour, to a mechanically stirred solution of 5.87 kg. of chromic anhydride (99.5% granular grade) in 20.5 liters of glacial acetic acid and 5 liters of water, maintained at temperatures between 30–65° C. As soon as the spontaneous reaction was completed the mixture was heated to 60–65° C. for fifteen minutes, and added to 100 liters of cold water, stirred vigorously (5–10 minutes). The precipitate was collected in a centrifuge and washed with 10–15 liters of cold water (until the filtrate was colorless). The moist precipitate was dissolved in 1.5 liters of chloroform, the solution was treated with decolorizing charcoal (25 g.), filtered, washed with 1 liter of 18% hydrochloric acid, with 1 liter of water, dried with sodium sulphate (50–100 g.) and filtered. The solvent was distilled from the filtered solution in vacuo.

The residue was dissolved in 0.3 liter of glacial acetic acid and two such solutions are added to 5 liters of hot methanol. On cooling, the crystalline product which formed (yield 1275–1328 g.) was collected in a centrifuge, washed with 100–200 cc. of methanol and had a melting point of 102–106° C. This product and those obtained in forty similar preparations contained no detectable quantity of chromium.

The yield of crystalline quinone, after the first crystallization, is 34% and the mother liquor, after adequate treatment, yields 5% more of the quinone. Accordingly, the yield of chromium-free, crystallized quinone amounts of 1275–1328 g., or a yield of 37–39%. Yields of this order of magnitude are regularly obtained by the process.

*Example 2*

The same general procedure described in Example 1 was employed with certain variations in a series of preparations and the results are summarized in the following table.

TABLE I

| Batch | Time of addition | | Temperature | Time of standing | | Temperature | Wt. cryst. product | M. P. | Yield | Cr analysis |
|---|---|---|---|---|---|---|---|---|---|---|
| | Hrs. | Min. | °C. | Hrs. | Min. | °C. | Grams | °C. | Per cent | |
| XVIIA XVIIB | 3 | 15 | ------ | 1 18 | 15 | (a) (b) | 900 | 102-6 | 26 | Purified same as Example 1 and there were no detectable amounts of chromium (0.001%) or less. |
| XVIIIA XVIIIB | 3 | 45 | ≦30 | 1 18 | 15 | (a) (b) | c 1,100 | 102-6 | 32 | |
| XIXA | 3 | 20 | ≦28 | 1 1 | | 14 (d) | 1,080 | 104-6 | 31.4 | |
| XIXB | 3 | 20 | ≦28 | 1 18 | | 14 (d) | | | | |
| XXA XXB | 3 | 20 | ≦28 | 1 ½ | | 14 28 | 1,080 | 104-6 | 31.4 | |
| XXIII | 2 | 15 | 25-30 | 1 | | 55 | 1,080 | 102-5 | 31.4 | |
| XXIV | 1 | 15 | 40-45 | 1 | | 40 | 1,085 | 102-6 | 31.6 | |
| XXV | 1 | | 45-50 | 1 | | 50 | 952 | 101-5 | 28 | |
| XXVI | 1 | | 45-50 | 1 | | 50 | 1,030 | 102-6 | 30 | |
| XXVII | | 51 | 45-50 | 1 | | 50 | 1,075 | 102-6 | 31 | | a With external ice cooling.
b At room temperature.
c The chloroform solutions of the crude product were combined and solvent was removed in vacuo. The residue was crystallized from a hot solution in 600 cc. of acetic acid and five liters of methanol.
d Slowly brought to 30° and precipitated immediately.

Example 3

Batch XXI was made for comparison, according to the method of the prior art in which the reverse order of addition to that of Examples 1 and 2 is used.

A solution of 5 kg. of chromium trioxide in 3.5 liters of glacial acetic acid diluted with 3.5 liters of water was added, with stirring, to a solution of 1.4 kg. of beta-methylnaphthalene in 15 liters of glacial acetic acid at such a rate that the temperature remained about 60° C. The addition required 1 hour and 40 minutes, and after remaining at 40° C. for ½ hour the reaction mixture was heated to 80°–90° C. for 40 minutes. The quinone was precipitated as usual in 50 liters of water, filtered off, washed with 20 liters of water and dried as much as possible on the filter. The product was crystallized from 4 liters of hot methanol and 455 g. (26.5% yield) of greenish yellow crystals (M. P. 100–105° C., Cr=1.425%) were obtained. Evaporation of the mother liquor yielded 110 g. of dark colored, gummy material (total: 565 g., 33% yield).

The first crop of crystals (455 g.) were divided in half and portion (1) purified according to the method of this invention, portion (2) purified according to prior methods.

Portion (1), (227.5 g.), was dissolved in chloroform, the solution decolorized with charcoal and extracted with 18% (aqueous) hydrochloric acid. The quinone residue, obtained by removal of the solvent from the dried solution, was dissolved in 80 cc. glacial acetic acid, 1100 cc. of hot methanol added and the product allowed to crystallize. 155 g. (M. P. 104–106° C., Cr=0.002%) of bright yellow needles were obtained. Concentration of the mother liquor caused 29 g. (M. P. 92–100° C.) of bright yellow solid to separate, and complete removal of the solvent left 31 g. of black oily solid.

Portion (2), (227.5 g.) was dissolved in 3 liters of hot methanol and 4.5 g. dark brown insoluble material filtered off. Concentration of the filtrate to 1200 cc. caused 158 g. of brown colored quinone (M. P. 101–105.5° C., Cr=0.0825%) to crystallize. Further concentration of the mother liquor yielded 41 g. (M. P. 92–101° C.) of brown solid, and evaporation of the solvent from the remaining solution left 17 g. of a brown solid residue.

It is apparent that the method used to purify portion (1) gave a more satisfactory product with regard to color, melting point, and low chromium content. In order to further substantiate this observation, the first crop of crystals obtained from portion (2) (158 g.) was treated as portion (1). 121 g. of quinone (M. P. 105–106° C., Cr=0.001%) were obtained, in the first crop of crytsals; 29 g. upon concentration of the mother liquor, and 31 g. of black oily solid upon evaporation to dryness. By this single treatment the melting point was brought up to the recorded value, and the chromium content decreased eighty-fold.

Example 4

Further experiments were carried out to determine the yield and nature of the products obtained when the order of mixing described by the prior art was followed. The results are tabulated in the following table:

TABLE II

| Exp. | Wt. $CrO_3$ in | AcOH plus | $H_2O$ | Wt. Me-naphthalene in | AcOH | Time of addition | Wt. purified quinone | M. P. | Yield | Cr. analysis |
|---|---|---|---|---|---|---|---|---|---|---|
| | | | | | | Minutes | Grams | °C. | Per cent | Per cent |
| 1 | 50 g. | 35 cc. | 35 cc. | 14.2 g. | 150 cc. | 9 | 6.8 | 100-2 | 39.5 | 0.018 |
| 2 | 50 g. | 35 cc. | 35 cc. | 14.2 g. (technical) | 150 cc. | | 5.0 | 99-102 | 29.0 | 0.016 |
| 3 | 345 g. | 245 cc. | 245 cc. | 100 g. | 1,060 cc. | | a 35.1 / b 10 | 99-100 | 29 | 0.0156 |
| 4 | 345 g. | 245 cc. | 245 cc. | 100 g. | 1,060 cc. | 23 | a 46 / b 6 | 99-102 | 38 | 0.697 |
| 5 | 345 g. | 245 cc. | 245 cc. | 100 g. (technical) | 1,060 cc. | 30 | a 33 / c 8 / b 11 | 100-3 / 85-9 | 27 / 34 | 0.416 |
| 6 | 345 g. | 245 cc. | 245 cc. | 100 g. (technical) | 1,060 cc. | 25 | a 31 / c 4 / b 15 | 100-6 / 87-96 | 25.6 / 29 | |
| 7 | 345 g. | 245 cc. | 245 cc. | 100 g. | 1,060 cc. | 20 | a 40 / c 10 / b 8 | 100-6 / 92-99 | 33 / 41 | 0.384 |
| 8 | 5 kg. | 3.5 l. | 3.5 l. | 1.42 kg. | 15 l. | 105 | d 520 / e 410 / f 272 | 105-6 | 30 / 24 / 16 | 0.018 / 0.011 / 0.008 |
| 9 | 5 kg. | 3.5 l. | 3.5 l. | 1.42 kg. | 15 l. | 70 | c 130 / g 84 | | 23 / 28 | n. d. / 0.001 |
| 10 | 5 kg. | 3.5 l. | 3.5 l. | 1.42 kg. (technical) | 15 l. | 100 | h 455 / j 155 / k 158 / l 121 | 100-5 / 104-6 / 101-105.5 / 104-6 | 26.5 | 1.825 / 0.002 / 0.0825 / 0.001 |
| 11 | 400 g. | 1,500 cc. | 362 cc. | 100 g. (technical) | 141 cc. | 17 | m 40 / n 9 | 105-6 / 88-90 | 33 | 0.0003 |
| 12 | 200 g. | 750 cc. | 181 cc. | 50 g. (technical) | 70.5 cc. | | o 7.2 / n 4 / p 7.4 / n 4 | 100-3 / 87-92 / 100-4 / 88-93 | | n. d. / n. d. | a First crop.
b Residue.
c Second crop.
d Crude quinone dissolved in 2.3 liters of chloroform, water was removed and solvent distilled. The residue was crystallized from 2 liters of methanol and yielded a brown product.
e Obtained by recrystallization of (d) from 2 liters of methanol.
f Crude, dry quinone dissolved in chloroform, washed with 18% HCl, dried with sodium sulfate, decolorized with charcoal, solvent distilled in vacuo, residue dissolved in acetic acid, methanol added and the quinone crystallized.
g Third crop.
h Product obtained from methanol solution.
i Evaporation of mother liquor left 110 g. of dark, gummy material.
j Obtained from one half (227.5 g.) of the prior art method purified quinone carried through our chloroform process. Concentration of the solution yielded 20 g. (M. P. 92–100°) yellow solid and complete evaporation of the solvent left 31 g. black oily solid.
k Obtained from the other half of the prior art method purified quinone by dissolving in hot methanol, filtering, concentrating and allowing to cool. The product was brown colored. Concentration of the mother liquor yielded 41 g. (M. P. 92–101°) brown solid and removal of the solvent left 17 g. brown solid.
l Obtained by treating (k) (150 g.) by chloroform process.
m Ethylene dichloride solution of crude quinone washed with 20% HCl.
n Isolated from mother liquor.
o Chloroform solution of one half of the crude quinone washed with 25% sulphuric acid.
p Ethylene dichloride solution of one half of the crude quinone washed with 25% sulphuric acid.

An examination of the data in the Table II reveals that in Experiments 1 and 2 the respective yields of purified quinone were 39.5 and 29.5%. In Experiment 1 a high grade of 2-methylnaphthalene was used; whereas in Experiment 2 crude 2-methylnaphthalene was used; and the low yield in Experiment 2 is attributed to the use of the poor grade of hydrocarbon. Increasing the amount of hydrocarbon to 100 grams in Experiments 3 and 4 did not alter the yield of the quinone. However, with an increase in hydrocarbon to 1.4 kg. in Experiments 8, 9, and 10 the yield dropped to 26–28%. In Experiments 3, 4, 5, 6, and 7 evaporation of the solvents from which the quinone had been crystallized left a dark tarry residue from which no quinone could be isolated. Apparently, therefore, under the conditions of these oxidation processes, products other than the quinone are produced.

Purification of the crude oxidation product according to the method described in the prior art gave a quinone containing from 0.0156 to 1.825% chromium as determined spectrophotometrically. In Experiment 10 the crystallized product was purified by the improved process of the present invention by dissolving in chloroform, treating with charcoal, filtering, and washing with 15–20% hydrochloric acid. The chloroform was then removed by vacuum distillation and the residue crystallized from a mixture of 80 cc. of glacial acetic acid and 1100 cc. of the methanol. An analysis then showed a chromium content of only about 0.002%. It is seen, therefore, that this procedure clearly diminished the chromium value to about $1/900$; whereas mere crystallization of the product of Experiment 10 (chromium 1.825%) from hot methanol decreased the chromium value only to 0.0825%. Purification of this product through solution in chloroform, treatment with hydrochloric acid, and charcoal as previously described, decreased the chromium value to 0.001% and this experiment serves to show that the latter method of purification is more effective for reducing the chromium content than mere crystallization from methanol. Further proof of a slow removal of chromium by mere recrystallization from methanol is obtained from Experiment 8, in which the value decreased only from 0.018 to 0.011%, notwithstanding that the original product had been largely separated from the impurities by extraction with chloroform and crystallization from methanol. In experiment 9, the crude product was extracted with chloroform, the solution was treated with 18% hydrochloric acid and decolorizing charcoal and the product, after crystallization from methanol, contained only 0.0089% of chromium. From the mother liquor in Experiment 9 a second crop of quinone was isolated containing no detectable quantity of chromium, and even the third crop of crystals contained only 0.001% chromium. In part the high chromium content obtained in Experiments (4–10) is attributable to the use of chromium oxide of a purity of only 99.5%, but the analytical data of Experiments 1–3 show that even with the reagent grade of oxide, the chromium content of the quinone as prepared by the prior art method is considerably higher than permissible in products intended for pharmaceutical uses.

As further evidence of the efficacy of the purification by chloroform extraction and treatment with acid, the results of Experiments 11 and 12 are cited. With the small quantity of methylnaphthalene used in these experiments (100 g. and 50 g. respectively), the product after purification showed a chromium content of only 0.0003% in Experiment 11 and was not detectable in Experiment 12, in which sulphuric acid was substituted for hydrochloric acid during purification. One-half the product of Experiment 12 was extracted with chloroform and the other half was extracted with ethylene dichloride and this solution was treated with sulphuric acid and decolorizing charcoal according to the abovementioned process. The product so purified again showed no detectable amount of chromium. Accordingly, this experiment shows that sulphuric acid may be substituted for hydrochloric acid in the purification process.

This experimental work shows that preparation of 2-methyl-naphthoquinone according to the method described in the prior art yields a product containing considerable amounts of chromium and that oily or tarry products are sometimes formed. Whereas the products in small batches are relatively easily purified, those from large-scale operations cannot be adequately purified by mere crystallization without undue loss of material. Invariably the crude product was highly colored and even after recrystallizations the products remained somewhat discolored.

In the methods for purification of the 2-methylnaphthoquinone described in the examples, chloroform was used as the water-immiscible solvent and dilute hydrochloric acid was used for removing the chromium. The chloroform may be replaced by other suitable water-immiscible organic solvents, such as for example, other chlorinated hydrocarbons, ethers, carbocyclic hydrocarbons such as toluene, benzene, chlorotoluene, benzochloride, xylene, and the like. Similarly the dilute hydrochloric acid may be replaced by other acids, for example, sulfuric acid, and the like.

What we claim is:

1. An improved method for the preparation of 2-methyl-1,4-naphthoquinone which comprises adding a solution of 2-methylnaphthalene in glacial acetic acid to a solution of chromic acid in approximately 80% glacial acetic acid while maintaining the temperature of the reaction mixture within the range of about 30° to 65° and diluting with a relatively large volume of cold water to precipitate the 2-methyl-1,4-naphthoquinone.

2. An improved method for the preparation of 2-methyl-1,4-naphthoquinone which comprises adding a solution of 2-methyl-naphthalene in glacial acetic acid to a solution of chromic acid in approximately 80% glacial acetic acid while maintaining the temperature of the reaction mixture within the range of about 30° to 65° C., after the addition is complete maintaining the mixture at a temperature of about 65° C. for a short time, diluting with a relatively large volume of cold water to precipitate 2 - methyl-1,4-naphthoquinone, removing the precipitate, dissolving it in chloroform, washing said chloroform solution at least once with a dilute aqueous solution of hydrochloric acid, separating the chloroform solution from the dilute acid solution, recovering the 2-methyl-1,4-naphthoquinone from the chloroform by evaporation of the latter, dissolving the residue in and recrystallizing from a mixture of methanol and acetic acid.

3. An improved method for the preparation of 2-methyl-1,4-naphthoquinone which comprises adding a solution of 2-methyl-naphthalene in in glacial acetic acid to a solution of chromic acid in approximately 80% glacial acetic acid while maintaining the temperature of the reaction mixture within the range of about 30° to 65° C., after the addition is complete maintaining the mixture at a temperature of about 65° C. for a short time, diluting with a relatively large volume of cold water to precipitate 2-methyl-1,4-naphthoquinone, removing the precipitate, dissolving it in chloroform, washing said chloroform solution at least once with a dilute aqueous solution of an inorganic acid, separating the chloroform solution from the dilute acid solution, recovering the 2 - methyl - 1,4 - naphthoquinone from the chloroform by evaporation of the latter, dissolving the residue in and recrystallizing from a mixture of methanol and acetic acid.

ROBERT W. PRICE.
GUSTAF H. CARLSON.